United States Patent
Goto et al.

(10) Patent No.: US 8,459,939 B2
(45) Date of Patent: Jun. 11, 2013

(54) COMPRESSOR STATOR BLADE AND COMPRESSOR ROTOR BLADE

(75) Inventors: Shinya Goto, Tokyo (JP); Takeshi Murooka, Tokyo (JP)

(73) Assignee: IHI Corporation, Tokyo (JP)

( * ) Notice: Subject to any disclaimer, the term of this patent is extended or adjusted under 35 U.S.C. 154(b) by 789 days.

(21) Appl. No.: 12/513,617

(22) PCT Filed: Mar. 28, 2007

(86) PCT No.: PCT/JP2007/056541
§ 371 (c)(1),
(2), (4) Date: Feb. 2, 2010

(87) PCT Pub. No.: WO2008/056454
PCT Pub. Date: May 15, 2008

(65) Prior Publication Data
US 2010/0143105 A1 Jun. 10, 2010

(30) Foreign Application Priority Data
Nov. 8, 2006 (JP) ................................ 2006-302551

(51) Int. Cl.
*F01D 11/08* (2006.01)
(52) U.S. Cl.
USPC .............. 415/173.1; 415/173.4; 415/173.5; 415/173.6; 415/173.7; 415/174.3; 415/174.4; 415/174.5
(58) Field of Classification Search
USPC .......... 415/173.1, 173.4, 173.5, 173.6, 173.7, 415/174.3, 174.4, 174.5
See application file for complete search history.

(56) References Cited

U.S. PATENT DOCUMENTS

| 3,146,938 | A | | 9/1964 | Smith |
| 4,433,845 | A | * | 2/1984 | Shiembob ................. 415/173.4 |
| 5,176,495 | A | * | 1/1993 | Honkomp et al. ......... 415/173.1 |
| 5,518,364 | A | | 5/1996 | Neise et al. |
| 6,962,484 | B2 | * | 11/2005 | Brandl et al. ................ 416/192 |
| 7,059,821 | B2 | * | 6/2006 | Farrell et al. ..................... 415/1 |

FOREIGN PATENT DOCUMENTS

| EP | 1 243 797 A2 | 9/2002 |
| JP | 3-168396 A | 7/1991 |
| JP | 2002-202099 A | 7/2002 |
| JP | 2002-310100 | 10/2002 |
| JP | 2002-371802 A | 12/2002 |
| JP | 2005-030316 A | 2/2005 |

OTHER PUBLICATIONS

Office Action issued in Canadian Patent Application No. 2,669,061, dated Aug. 20, 2010.
International Search Report, issued in corresponding application PCT/JP2007/056541, completed May 8, 2007, mailed May 22, 2007.
Office Action issued in corresponding Japanese application 2006-302551 issued on Sep. 21, 2012 (no translation available; submitted for certification).

* cited by examiner

*Primary Examiner* — Igor Kershteyn
(74) *Attorney, Agent, or Firm* — Griffin & Szipl, P.C.

(57) ABSTRACT

A compressor stator blade 10 includes a seal mechanism 12 configured to hermetically seal a part between a radial inner end on the upstream side and an outer surface of a rotary body, and a remainder part on the downstream side of the seal mechanism includes a hub clearance 14 between the outer surface of the rotary body and itself. Additionally, a compressor rotor blade 20 includes a seal mechanism 22 configured to hermetically seal a part between a radial outer end on the upstream side and an inner surface of a stationary body, and a remainder part on the downstream side of the seal mechanism includes a tip clearance 24 between the inner surface of the stationary body and itself.

5 Claims, 6 Drawing Sheets

Fig. 1

Prior Art

Fig. 2

Prior Art

Fig. 4A
Prior Art flow direction

Fig. 4B
Prior Art rotor rotation direction

Fig. 4C
Prior Art flow direction

Fig. 4D
Prior Art rotor rotation direction

COMPRESSOR STATOR BLADE AND COMPRESSOR ROTOR BLADE

This is a National Phase Application in the United States of International Patent Application No. PCT/JP2007/056541 filed Mar. 28, 2007, which claims priority on Japanese Patent Application No. 2006/302551, filed Nov. 8, 2006. The entire disclosures of the above patent applications are hereby incorporated by reference.

BACKGROUND OF THE INVENTION

1. Technical Field of the Invention

The present invention relates to a compressor blade, and more particularly, to a compressor stator blade and a compressor rotor blade.

2. Description of the Related Art

In a gas turbine or a jet engine, a compressor for compressing an air introduced from the outside is configured as a multi-stage axial flow type compressor in which a rotor blade row and a stator blade row are alternately combined.

In the multi-stage axial flow type compressor, a radial inner end part (hub side) of a stator blade constituting the stator blade row or a radial outer end part (tip side) of a rotor blade constituting the rotor blade row includes a gap (clearance) between each facing surface and itself, and a leakage flow (clearance flow) flowing through the clearance is a factor causing deterioration in performance of the compressor.

Thus, Patent Documents 1 and 2 have already disclosed methods of reducing the leakage flow (clearance flow) or its influence.

A shroud integrated rotor blade disclosed in Patent Document 1 aims to prevent a leakage flow of a gas path.

Figure 1:
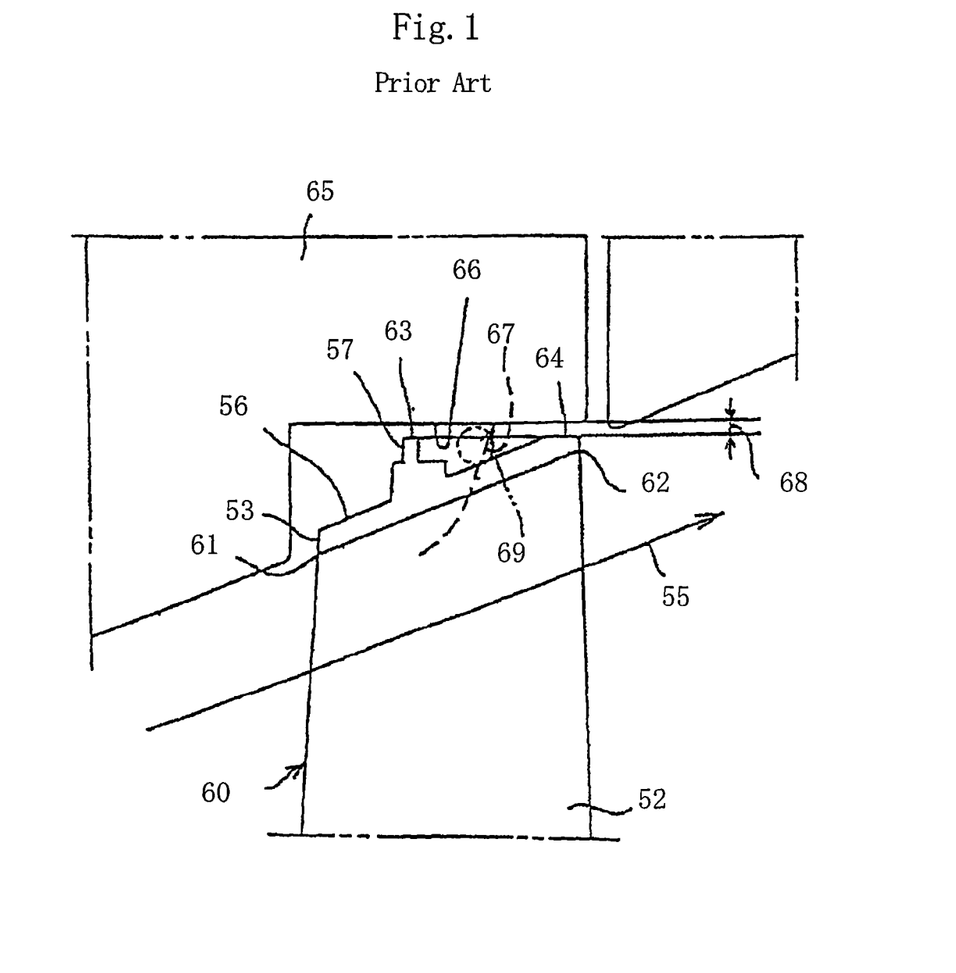
FIG. 1 is a schematic view showing a shroud integrated type rotor blade disclosed in Patent Document 1.

As shown in FIG. 1, in a shroud integrated type rotor blade 60, a shroud 53 is provided from a front edge 61 of a tip of a rotor blade 52 to a rear edge 62, and a radius of a seal fin tip end 63 is substantially the same as that of a shroud rear edge end 64. In a split ring 65, a radius of an inner peripheral surface 66 is slightly larger than those of the seal fin tip end 63 and the shroud rear edge end 64. As a result, a cavity sectional area 69 existing on the downstream side of a seal fin 57 can be reduced between an outer surface 56 of the shroud 53 and an inner peripheral surface 66 of the split ring 65. For this reason, as for a leakage flow 67 passing through an empty space in the vicinity of a throat from a gas path 55, the flow is shut off by the inner peripheral surface 66 of the split ring 65. In this manner, even when the shroud 53 of a winglet type is used, a leakage flow 67 of the gas path 55 can be prevented.

A shroud segment disclosed in Patent Document 2 aims to promote a simplification of an aircraft engine and a decrease in weight of the aircraft engine by suppressing an increase in the number of components of the aircraft engine.

Figure 2:
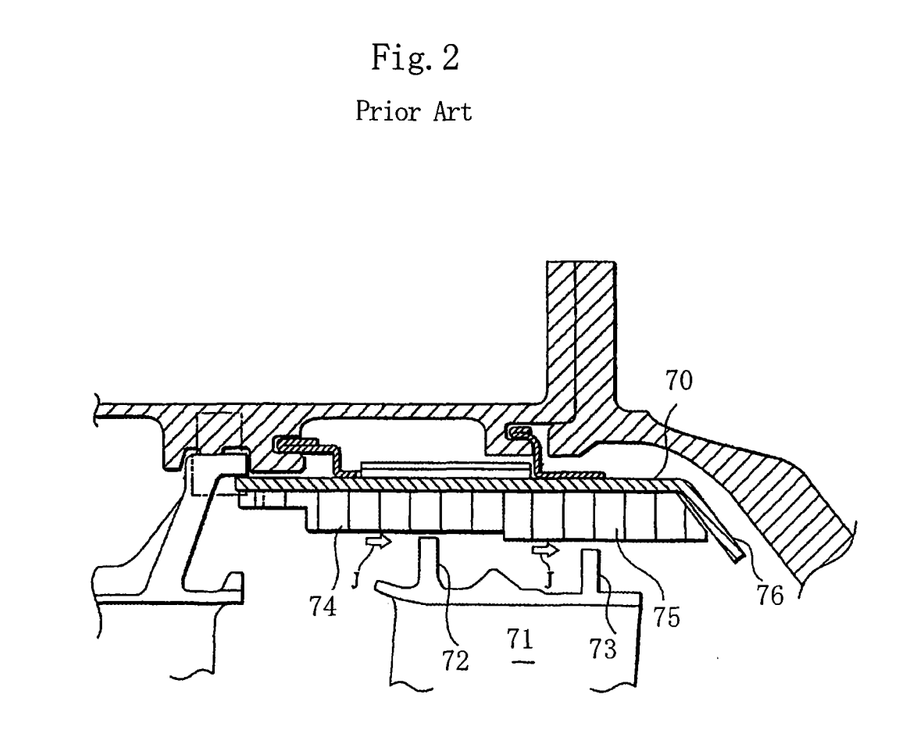
FIG. 2 is a schematic view showing "a shroud segment" disclosed in Patent Document 2.

As shown in FIG. 2, honeycomb cells 74 and 75 allowing the contact thereof with tip fins 72 and 73 of a turbine blade 71 are integrally formed with the rear surface of a back plate 70. A jet shield 76 allowed to collide with a jet J of burned gas leaking between the honeycomb cells 74 and 75 and the tip fins 72 and 73 is integrally formed at the rear end part of the back plate 70.

[Patent Document 1]

Japanese Patent Application Laid-Open No. 2002-371802 "Shroud Integrated Type Rotor Blade and Split Ring of Gas Turbine"

[Patent Document 2]

Japanese Patent Application Laid-Open No. 2005-30316 "SHROUD SEGMENT"

Figure 3A:
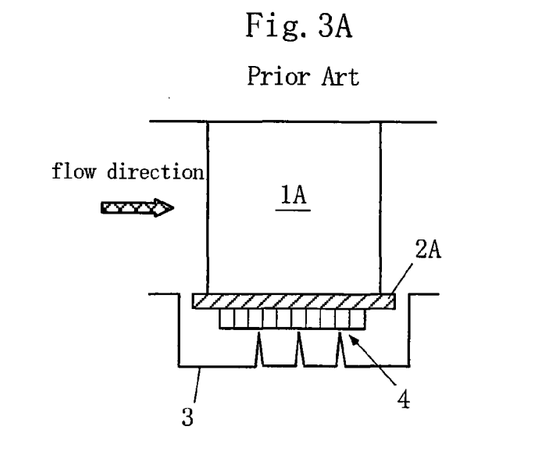
FIG. 3A is a side view showing a flow field on the stator blade hub side of a both-end-support stator blade.
Figure 3B:
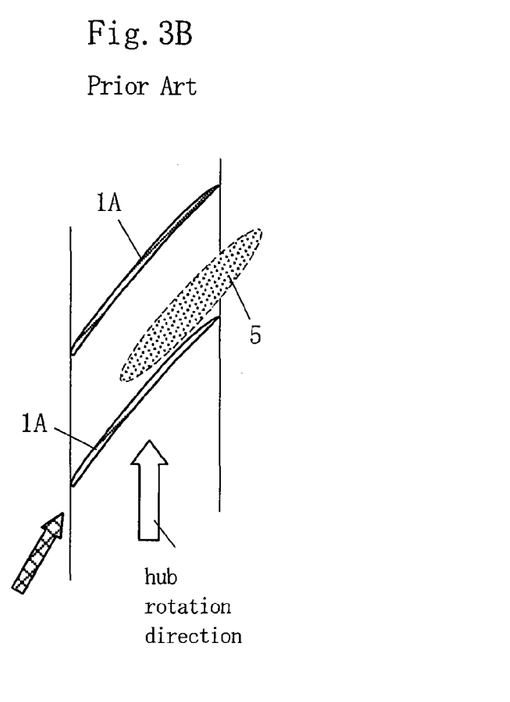
FIG. 3B is a side view showing a flow fluid on the stator blade hub side of a both-end-support stator blade row.
Figure 3C:
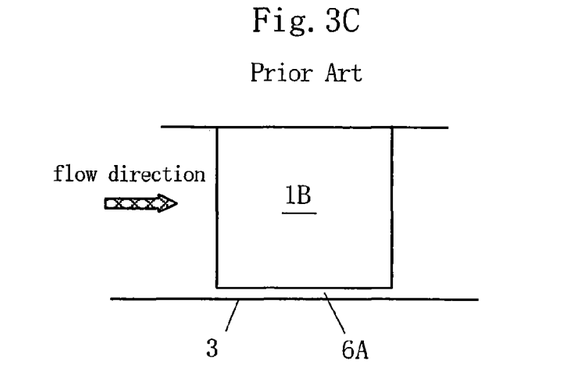
FIG. 3C is a side view showing a flow field on the stator blade hub side of a stator blade mounted with a hub clearance
Figure 3D:
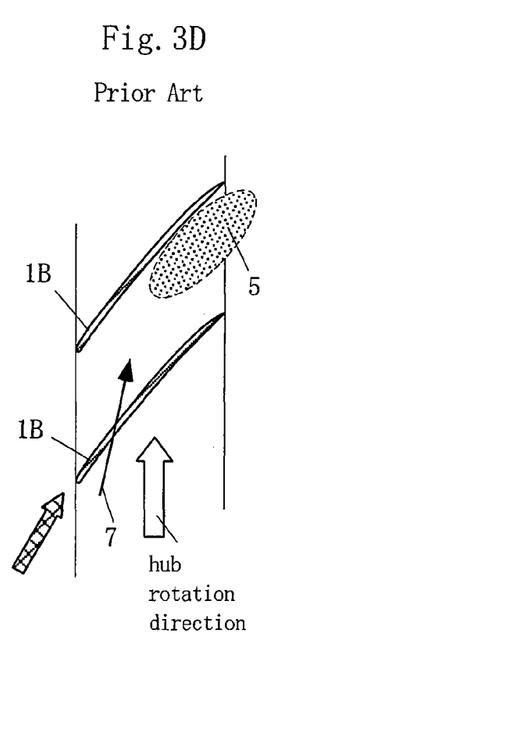
FIG. 3D is a top view showing a flow field on the stator hub side of a stator blade row mounted with a hub clearance.
Figure 3E:
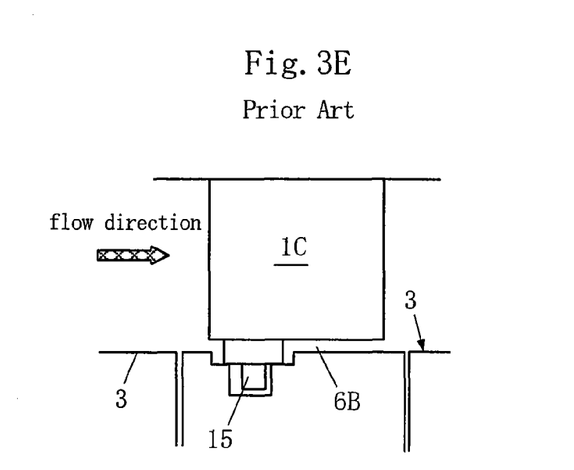
FIG. 3E is a side view showing a flow fluid of a conventional structure of a stator blade mounted with a spindle.

FIGS. 3A to 3E are views showing a flow field on the stator blade hub side of a convention structure. In these drawings, FIGS. 3A and 3B are views in the case of a both-end-support stator blade, FIGS. 3C and 3D are views in the case of a stator blade mounted with a hub clearance, and FIG. 3E is a view in the case of a stator blade mounted with a spindle.

FIG. 3A is a side view showing the both-end-support stator blade. In this drawing, a both-end-support stator blade 1A includes a radial outer end (tip side) fixed to an inner surface of a stationary body such as a casing and a radial inner end (hub side) fixed to a hub shroud 2A. Additionally, a labyrinth 4 is provided between the hub shroud 2A and an inner rotary body 3 so as to seal a part therebetween.

FIG. 3B is a top view showing the blade row of the both-end-support stator blade. In this case, since a clearance flow does not occur at a position on the tip side and the hub side of the stator blade 1A, a low energy fluid 5 is accumulated in a negative pressure surface corner part of each stator blade 1A. Here, the low energy fluid indicates a fluid in which a speed is low and a swirl or a separation occurs. Since a flow is dispersed at the negative pressure surface of the stator blade by the existence of the low energy fluid 5, a performance of the stator blade deteriorates.

FIG. 3C is a side view showing the stator blade mounted with the hub clearance. In this drawing, a stator blade 1B mounted with the hub clearance includes a radial outer end (tip side) fixed to an inner surface of a stationary body such as a casing and a radial inner end (hub side) located so as to have a gap from the inner rotary body 3. That is, the stator blade 1B mounted with the hub clearance includes a hub-side gap (hub clearance 6A) between the rotary body 3 and itself.

FIG. 3D is a top view showing the blade row of the stator blade mounted with the hub clearance. In this case, a clearance flow 7 flowing through the hub clearance 6A occurs at a position on the hub side of the stator blade 1B. Since the clearance flow 7 flows from a pressure surface of the stator blade 1B to a negative pressure surface, as shown in FIG. 3B, the low energy fluid 5 accumulated in the negative pressure surface corner part moves toward the pressure surface side of the adjacent blade due to the clearance flow 7. As a result, the low energy fluid 5 is accumulated at a position on the pressure surface side of each stator blade 1B. Since a flow is dispersed at the pressure surface of the stator blade by the existence of the low energy fluid 5, a performance of the stator blade deteriorates.

FIG. 3E is a side view showing the stator blade mounted with the spindle. In this drawing, the stator blade 10 mounted with the spindle includes a radial outer end (tip side) fixed to an inner surface of a stationary body such as a casing and a radial inner end (hub side) fixed to a stationary part via a spindle mechanism 15. Although the stator blade 10 mounted with the spindle includes a hub-side gap (hub clearance 6B) between the stationary part and itself, since the facing surface is in a stationary state, a clearance flow hardly occurs.

For this reason, the top view showing the blade row of the stator blade mounted with the spindle is the same as that of FIG. 3B, and the low energy fluid 5 is accumulated in the negative pressure surface corner part of each stator blade. Since a flow is dispersed at the negative pressure surface of the stator blade by the existence of the low energy fluid 5, a performance of the stator blade deteriorates.

The above-described problems also occur in the compressor rotor blade.

Figure 4A:
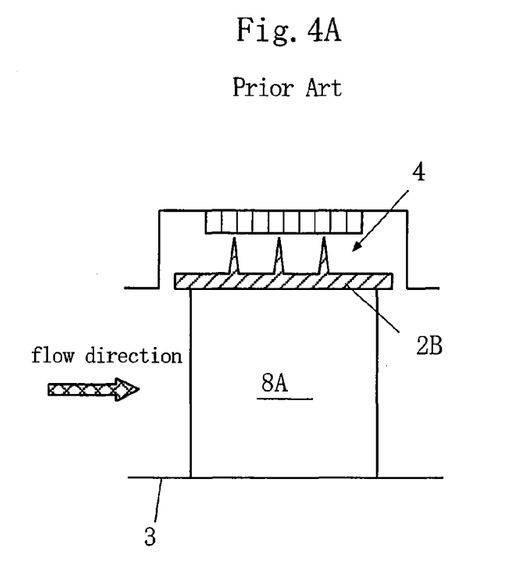
FIG. 4A is a side view showing a flow fluid on the rotor blade tip side of a rotor blade mounted with a shroud.
Figure 4B:
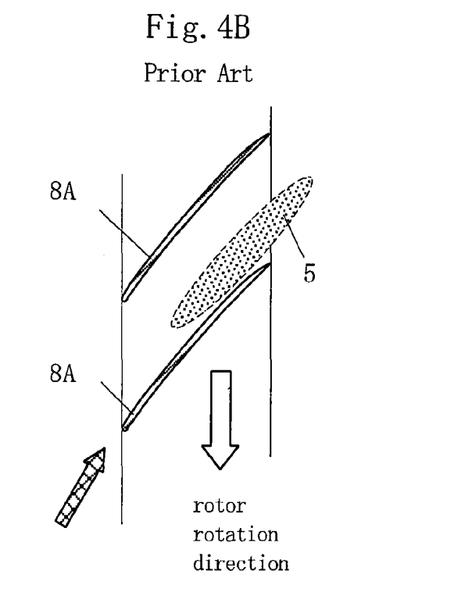
FIG. 4B is a top view showing a flow fluid on the rotor blade tip side of a rotor blade row mounted with a shroud.
Figure 4C:
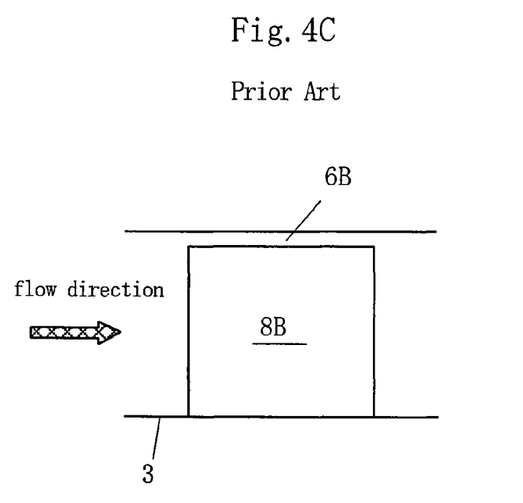
FIG. 4C is a side view showing a flow fluid on the rotor blade tip side of a rotor blade mounted with a clearance.
Figure 4D:
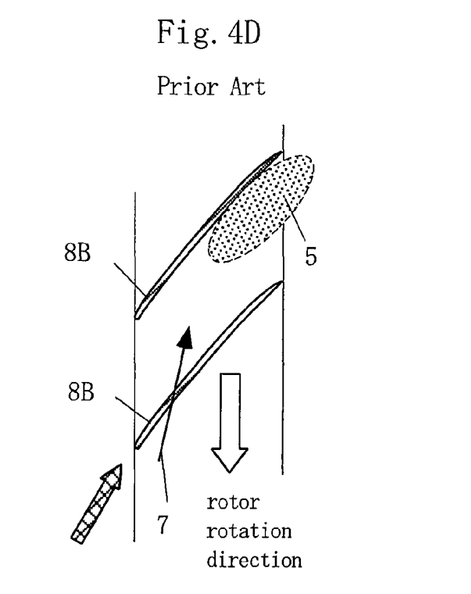
FIG. 4D is a top view showing a flow fluid on the rotor blade tip side of a rotor blade row mounted with a clearance.

FIGS. 4A to 4D are views showing a flow field on the rotor blade tip side of a conventional structure. In this drawing, FIGS. 4A and 4B are views in the case of a rotor blade mounted with a shroud, and FIGS. 4C and 4D are views in the case of a rotor blade mounted with a clearance.

FIG. 4A is a side view showing the rotor blade mounted with the shroud. In this drawing, a rotor blade 8A mounted with the shroud includes a radial inner end (hub side) fixed to the inner rotary body 3 and a radial outer end (tip side) fixed to a tip shroud 2B. Additionally, the labyrinth 4 is provided between the tip shroud 2B and an outer stationary body so as to seal a part therebetween.

FIG. 4B is a top view showing the blade row of the rotor blade mounted with the shroud. In this case, since a clearance flow does not occur at a position on the tip side and the hub side of the rotor blade 8A, the low energy fluid 5 is accumulated in the negative pressure surface corner part of each rotor blade 8A. Since a flow is dispersed at the negative pressure surface of the rotor blade by the existence of the low energy fluid, a performance of the rotor blade deteriorates.

FIG. 4C is a side view showing the rotor blade mounted with the clearance. In this drawing, a rotor blade 8B mounted with the clearance includes a radial inner end (hub side) fixed to the inner rotary body 3 and a radial outer end (tip side) located so as to have a gap from the outer stationary body. That is, the rotor blade 8B mounted with the clearance includes a tip-side gap (tip clearance 6B) between the outer stationary body and itself.

FIG. 4D is a top view showing the blade row of the rotor blade mounted with the clearance. In this case, the clearance flow 7 flowing through the tip clearance 6B occurs at a position on the tip side of the rotor blade 8B. Since the clearance flow 7 flows from a pressure surface of the rotor blade 8B to a negative pressure surface, as shown in FIG. 4B, the low energy fluid 5 accumulated in the negative pressure surface corner part moves toward the pressure surface side of the adjacent blade due to the clearance flow 7. As a result, the low energy fluid 5 is accumulated at a position on the pressure surface side of each rotor blade 8B. Since a flow is dispersed at the pressure surface of the rotor blade by the existence of the low energy fluid 5, a performance of the rotor blade 8B deteriorates.

SUMMARY OF THE INVENTION

The present invention is contrived to solve the above-described problems. That is, an object of the invention is to provide a compressor stator blade and a compressor rotor blade capable of reducing an influence of a low energy fluid occurring between blade rows and of preventing deterioration in blade row performance.

According to the invention, there is provided a compressor stator blade of which a radial outer end is fixed and a radial inner end is located closer to an outer surface of a rotary body, the compressor stator blade including: a seal mechanism configured to hermetically seal a part between the radial inner end on the upstream side and the outer surface of the rotary body, wherein a remainder part on the downstream side of the seal mechanism includes a hub clearance between the outer surface of the rotary body and itself.

According to a preferred embodiment of the invention, the seal mechanism includes a hollow cylindrical hub shroud configured to surround the outer surface of the rotary body so as to have a uniform gap therebetween and a seal member configured to hermetically seal a part between the hub shroud and the outer surface of the rotary body.

According to another preferred embodiment, the seal mechanism is a variable blade spindle mechanism.

The outer surface of the rotary body located in the hub clearance rotates from a pressure surface side of the blade to a negative pressure surface side thereof.

According to the invention, there is provided a compressor rotor blade of which a radial inner end is fixed to an outer surface of a rotary body and a radial outer end is located closer to an inner surface of a stationary body, the compressor rotor blade including: a seal mechanism configured to hermetically seal a part between the radial outer end on the upstream side and the inner surface of the stationary body, wherein a remainder part on the downstream side of the seal mechanism includes a tip clearance between the inner surface of the stationary body and itself.

According to a preferred embodiment of the invention, the seal mechanism includes a shroud cavity which is a hollow cylindrical concave groove provided in the inner surface of the stationary body and a hollow cylindrical tip shroud which is located in the shroud cavity so as to have a uniform gap from the inner surface of the stationary body.

Further, a seal member is provided between a tip shroud and a shroud cavity.

In the compressor stator blade according to the invention, since a part between the radial inner end on the upstream side (on the hub side) and the outer surface of the rotary body is hermetically sealed by the seal mechanism, a clearance flow does not occur. However, since the remainder part on the downstream side of the seal mechanism includes the hub clearance between the outer surface of the rotary body and itself, a clearance flow occurs at a position in the vicinity of the rear edge.

A low energy fluid accumulated in a corner part of the negative pressure surface is flown away by the clearance flow occurring at a position in the vicinity of the rear edge (tail edge: T/E), thereby suppressing a separation in this region.

Accordingly, (1) high efficiency can be expected because the low energy fluid accumulated at a position on the hub side is reduced, and (2) loss caused by a leakage flow can be reduced because a static pressure difference is smaller than that of a structure having a slit on the downstream side of a T/E.

In the compressor rotor blade according to the invention, since a part between the radial outer end on the upstream side and the inner surface of the stationary body is hermetically sealed by the seal mechanism, a clearance flow does not occur. However, since the remainder part on the downstream side of the seal mechanism includes the tip clearance between the inner surface of the stationary body and itself, a clearance flow occurs.

A low energy fluid accumulated in a corner part of the negative pressure surface is flown away by the clearance flow occurring at a position in the vicinity of the rear edge (tail edge: T/E), thereby suppressing a separation in this region.

Accordingly, (1) high efficiency can be expected because the clearance flow flowing into a position in the vicinity of the front edge (leading edge: L/E) and the separation at the corner part are suppressed so as to reduce the accumulation of the lower energy fluid on the tip side, and (2) a surge margin expansion can be expected because the low energy fluid on the tip side in the shroud cavity is extracted.

Further, the above-described advantage according to the invention is verified by means of the CFD (computer fluid dynamics) analysis.

DESCRIPTION OF THE PREFERRED EMBODIMENT

Hereinafter, preferred embodiments of the invention will be described with reference to the accompanying drawings. Additionally, in the respective drawings, the same reference numerals are given to the same components, and the repetitive description thereof will be omitted.

Figure 5A:
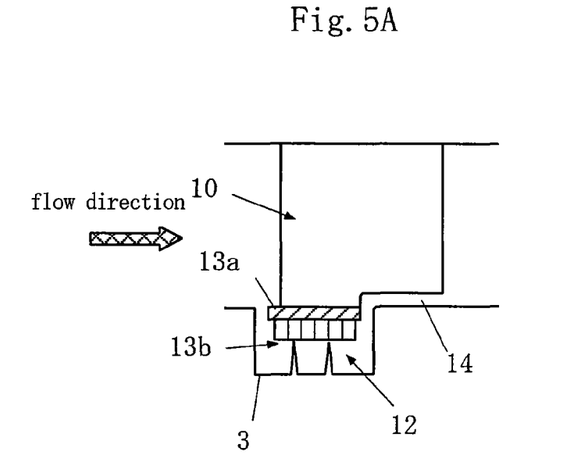
FIG. 5A is a view showing a structure of a compressor stator blade according to a first embodiment of the invention.
Figure 5B:
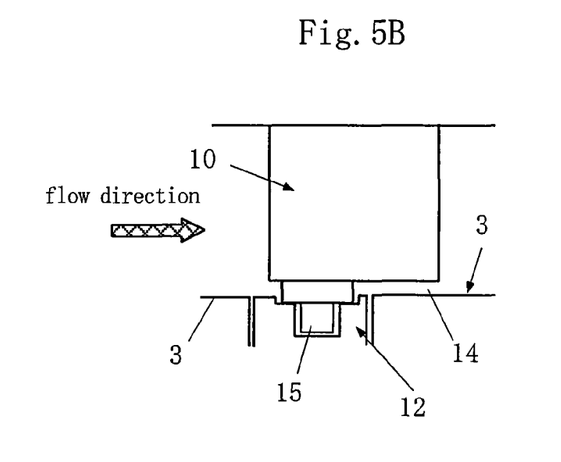
FIG. 5B is a view showing a structure of a compressor stator blade according to a second embodiment of the invention.
Figure 5C:
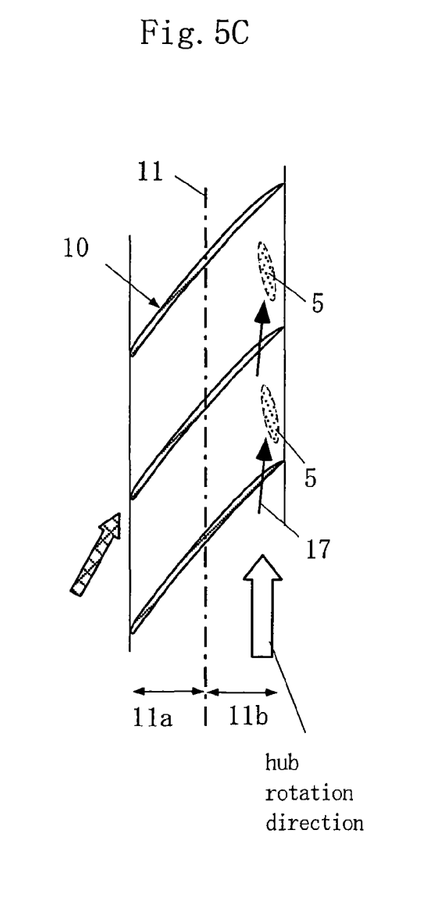
FIG. 5C is a view showing an advantage of the compressor stator blade according to the invention.

FIGS. 5A to 5C are views showing a configuration of a compressor stator blade according to the invention, where FIG. 5A shows a first embodiment, FIG. 5B shows a second embodiment, and FIG. 5C shows the common advantage.

In FIGS. 5A and 5B, a compressor stator blade 10 according to the invention is a compressor stator blade of which a radial outer end is fixed and a radial inner end is located closer to an outer surface of a rotary body 3.

The compressor stator blade 10 according to the invention includes a seal mechanism 12 which hermetically seals a part between the radial inner end on the upstream side and the outer surface of the rotary body 3, and the remainder part on the downstream side of the seal mechanism 12 includes a hub clearance 14 between the outer surface of the rotary body 3 and itself.

Desirably, a region on the upstream side sealed by the seal mechanism 12 is from a front edge (leading edge: L/E) to a maximum blade thickness part, and a region of the hub clearance 14 is from the maximum blade thickness part to a rear edge (tail edge: T/E).

Additionally, it is desirable that a gap of the hub clearance 14 from the outer surface of the rotary body be uniform.

However, the invention is not limited to this configuration, and the region of the hub clearance 14 may be provided up to a position in the vicinity of the rear edge or the gap may be changed in the range that the advantage is verified by means of a CFD analysis.

In the example shown in FIG. 5A, the seal mechanism 12 includes a hollow cylindrical hub shroud 13a which surrounds the outer surface of the rotary body 3 so as to have a uniform gap therebetween and a seal member 13b (for example, a labyrinth seal) which hermetically seals a part between the hub shroud 13a and the outer surface of the rotary body 3.

In the example shown in FIG. 5B, the seal mechanism 12 is a variable blade spindle mechanism 15. The spindle mechanism 15 may have a known structure.

In FIG. 5C, a dashed-dotted line 11 indicates a boundary between the seal mechanism 12 and the hub clearance 14. In this drawing, a left region 11a of the dashed-dotted line 11 is a hub wall surface stationary part, and a right region 11b thereof is a hub wall surface rotary part.

In the hub wall surface rotary part 11b, the outer surface of the rotary body 3 located at the hub clearance 14 rotates from a pressure surface side of the blade to a negative pressure surface side thereof (in this drawing, from the downside to the upside).

As schematically shown in FIG. 5C, in the above-described compressor stator blade 10 according to the invention, since a part between the radial inner end on the upstream side and the outer surface of the rotary body is hermetically sealed by the seal mechanism 12, a clearance flow does not occur. However, since the remainder part on the downstream side of the seal mechanism 12 includes the hub clearance 14 between the outer surface of the rotary body 3 and itself, a clearance flow 17 occurs at a position in the vicinity of the rear edge.

A low energy fluid 5 accumulated in a corner part of the negative pressure surface is flown away by the clearance flow 17 occurring at a position in the vicinity of the rear edge (tail edge: T/E), thereby suppressing a separation in this region.

Accordingly, (1) high efficiency can be expected because the low energy fluid accumulated at a position on the hub side is reduced, and (2) loss caused by a leakage flow can be reduced because a static pressure difference is smaller than that of a structure having a slit on the downstream side of a T/E.

Figure 6A:
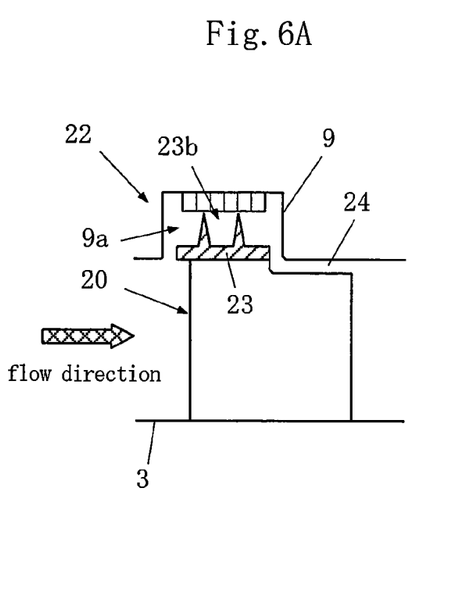
FIG. 6A is a view showing a structure of a compressor rotor blade according to the first embodiment of the invention.
Figure 6B:
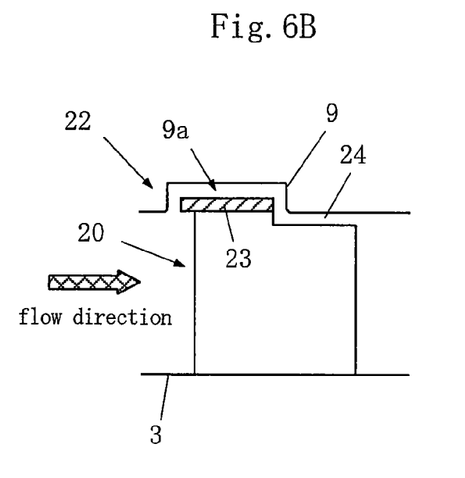
FIG. 6B is a view showing a structure of a compressor rotor blade according to the second embodiment of the invention.
Figure 6C:
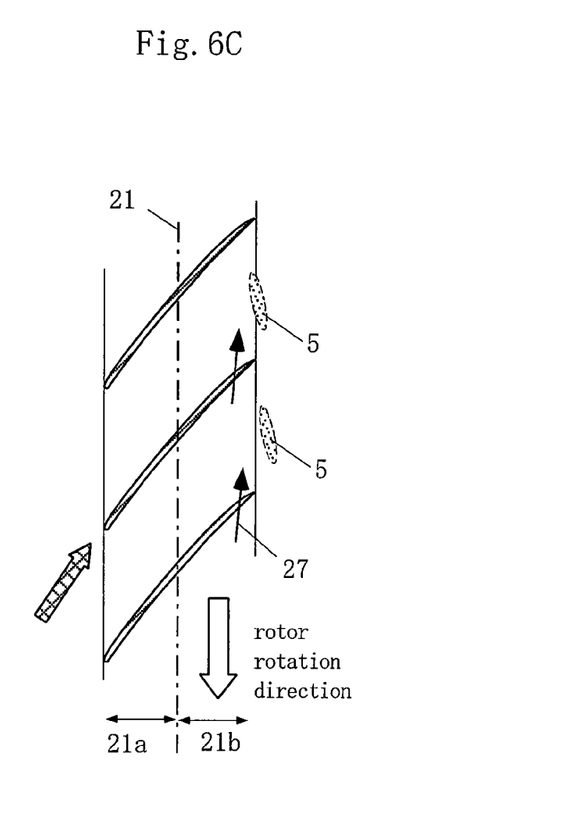
FIG. 6C is a view showing an advantage of the compressor rotor blade according to the invention.

FIGS. 6A to 6C are views showing a configuration of a compressor rotor blade according to the invention, where FIG. 6A shows the first embodiment, FIG. 6B shows the second embodiment, and FIG. 6C shows the common advantage.

In FIGS. 6A and 6B, a compressor rotor blade 20 according to the invention is a compressor rotor blade of which a radial inner end is fixed to the outer surface of the rotary body 3 and a radial outer end is located closer to an inner surface of a stationary body.

The compressor rotor blade 20 according to the invention includes a seal mechanism 22 which hermetically seals a part between the radial outer end on the upstream side and the inner surface of the stationary body, and the remainder part on the downstream side of the seal mechanism 22 includes a tip clearance 24 between the inner surface of the stationary body and itself.

Desirably, a region on the upstream side sealed by the seal mechanism 22 is from the front edge (leading edge: L/E) to the maximum blade thickness part, and a region of the tip clearance 24 is from the maximum blade thickness part to the rear edge (tail edge: T/E).

Additionally, it is desirable that a gap of the tip clearance 24 from the inner surface of the rotary body be uniform.

However, the invention is not limited to this configuration, and the region of the tip clearance 24 may be provided up to a position in the vicinity of the rear edge or the gap may be changed in the range that the advantage is verified by means of the CFD analysis.

In FIGS. 6A and 6B, the seal mechanism 22 includes a shroud cavity 9a which is a hollow cylindrical concave groove provided in the inner surface of a stationary body 9 and a hollow cylindrical tip shroud 23 which is located in the shroud cavity 9a so as to have a uniform gap from the inner surface of the stationary body.

In FIG. 6A, there is provided a seal member 23b (for example, a labyrinth seal) between the tip shroud 23 and the shroud cavity 9a.

In FIG. 6C, a dashed-dotted line 21 indicates a boundary between the seal mechanism 22 and the tip clearance 24. In this example, a left region 21a of the dashed-dotted line 21 is the upstream side without a clearance flow, and a right region 21b is the downstream side with a clearance flow. The compressor rotor blade 20 rotates from the negative pressure surface side to the pressure surface side.

In the above-described compressor rotor blade 20 according to the invention, since a part between the radial outer end on the upstream side and the inner surface of the stationary body is hermetically sealed by the seal mechanism 22, a clearance flow does not occur. However, since the remainder part on the downstream side of the seal mechanism 22 includes the tip clearance 24 between the inner surface of the stationary body and itself, a clearance flow 27 occurs at a position in the vicinity of the rear edge.

A low energy fluid accumulated in a corner part of the negative pressure surface is flown away by the clearance flow 27 occurring at a position in the vicinity of the rear edge (tail edge: T/E), thereby suppressing a separation in this region.

Accordingly, (1) high efficiency can be expected because the clearance flow flowing into a position in the vicinity of the front edge (leading edge: L/E) and the separation at the corner part are suppressed so as to reduce the accumulation of the lower energy fluid 5 on the tip side, and (2) a surge margin expansion can be expected because the low energy fluid 5 on the tip side in the shroud cavity is extracted.

Further, the above-described advantage according to the invention is verified by means of the CFD analysis.

Furthermore, the invention is not limited to the above-described embodiments, but may be, of course, modified into various forms without departing from the spirit of the invention.

The invention claimed is:

1. A compressor stator blade comprising a radial outer end that is fixed and a radial inner end that is located closer to an outer surface of a rotary body, wherein the compressor stator blade comprises:
   (a) a seal mechanism configured to hermetically seal a first part between the radial inner end of the compressor stator blade on an upstream side and the outer surface of the rotary body, wherein the seal mechanism is a variable blade spindle mechanism; and
   (b) a remainder part on a downstream side of the seal mechanism, wherein the remainder part includes a hub clearance between the outer surface of the rotary body and the remainder part.

2. The compressor stator blade according to claim 1, wherein the seal mechanism includes a hollow cylindrical hub shroud configured to surround the outer surface of the rotary body so as to have a uniform gap therebetween and a seal member configured to hermetically seal the first part between the hub shroud and the outer surface of the rotary body.

3. The compressor stator blade according to claim 1, wherein the outer surface of the rotary body that is located in the hub clearance rotates from a pressure surface side of the compressor stator blade to a negative pressure surface side thereof.

4. A compressor rotor blade comprising a radial inner end that is fixed to an outer surface of a rotary body and a radial outer end that is located closer to an inner surface of a stationary body, wherein the compressor rotor blade comprises:
   (a) a seal mechanism configured to hermetically seal a first part between the radial outer end on an upstream side and the inner surface of the stationary body; and
   (b) a remainder part on a downstream side of the seal mechanism, wherein the remainder part includes a tip clearance between the inner surface of the stationary body and the remainder part, and wherein the seal mechanism includes a shroud cavity that is a hollow cylindrical concave groove provided in the inner surface of the stationary body and a hollow cylindrical tip shroud that is located in the shroud cavity so as to have a uniform gap from the inner surface of the stationary body.

5. A compressor rotor blade comprising a radial inner end that is fixed to an outer surface of a rotary body and a radial outer end that is located closer to an inner surface of a stationary body, wherein the compressor rotor blade comprises:
   (a) a seal mechanism configured to hermetically seal a first part between the radial outer end on an upstream side and the inner surface of the stationary body, wherein the seal mechanism includes a tip shroud and a shroud cavity; and
   (b) a remainder part on a downstream side of the seal mechanism, wherein the remainder part includes a tip clearance between the inner surface of the stationary body and the remainder part, wherein a seal member is provided between the tip shroud and the shroud cavity of the seal mechanism.

* * * * *